(12) United States Patent
Hwang et al.

(10) Patent No.: US 10,182,346 B2
(45) Date of Patent: Jan. 15, 2019

(54) METHOD FOR TRANSMITTING SECURITY DATA AND METHOD FOR RECEIVING SAME

(71) Applicant: LG ELECTRONICS INC., Seoul (KR)

(72) Inventors: Daesung Hwang, Seoul (KR); Joonkui Ahn, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 102 days.

(21) Appl. No.: 15/035,107

(22) PCT Filed: Oct. 17, 2014

(86) PCT No.: PCT/KR2014/009776
§ 371 (c)(1),
(2) Date: May 6, 2016

(87) PCT Pub. No.: WO2015/068960
PCT Pub. Date: May 14, 2015

(65) Prior Publication Data
US 2016/0295403 A1    Oct. 6, 2016

Related U.S. Application Data

(60) Provisional application No. 61/901,427, filed on Nov. 7, 2013.

(51) Int. Cl.
*H04W 12/02*    (2009.01)
*H04L 9/06*     (2006.01)
(Continued)

(52) U.S. Cl.
CPC .............. *H04W 12/02* (2013.01); *H04L 9/065* (2013.01); *H03M 13/29* (2013.01);
(Continued)

(58) Field of Classification Search
CPC . H04L 2209/80; H04L 2209/08; H04L 9/065; H04L 9/06; H04W 12/02;
(Continued)

(56) References Cited

U.S. PATENT DOCUMENTS 5,706,346 A     1/1998   Katta et al.
7,302,565 B2 *  11/2007  Meandzija .......... H04L 63/0407
                                                      380/268

(Continued)

FOREIGN PATENT DOCUMENTS

CN    101981856 A    2/2011
CN    102124686 A    7/2011

*Primary Examiner* — Jayesh M Jhaveri
(74) *Attorney, Agent, or Firm* — Birch, Stewart, Kolasch & Birch, LLP (57) ABSTRACT

According to one embodiment of the present specification, a method for transmitting security data is disclosed. The method for transmitting security data can comprise the steps of: outputting a first sequence by scrambling a bit stream of dummy data; outputting a second sequence by scrambling the security data to be transmitted by using the bit stream; and transmitting a first code word and a second code word obtained by encoding the first sequence and the second sequence.

6 Claims, 10 Drawing Sheets

(51) Int. Cl.
*H03M 13/00* (2006.01)
*H03M 13/09* (2006.01)
*H03M 13/29* (2006.01)

(52) U.S. Cl.
CPC ...... *H03M 13/2903* (2013.01); *H03M 13/635* (2013.01); *H03M 13/6356* (2013.01); *H04L 2209/08* (2013.01); *H04L 2209/80* (2013.01)

(58) Field of Classification Search
CPC .......... H03M 13/2903; H03M 13/635; H03M 13/6356; H03M 13/00; H03M 13/29
See application file for complete search history.

(56) References Cited

U.S. PATENT DOCUMENTS

| | | | |
|---|---|---|---|
| 8,694,017 B2* | 4/2014 | Bhushan | H04L 63/0492 370/209 |
| 9,009,572 B2* | 4/2015 | Lobinger | H03M 13/2903 714/774 |
| 2003/0061500 A1 | 3/2003 | Mimura et al. | |
| 2005/0078016 A1 | 4/2005 | Neff | |
| 2009/0287985 A1* | 11/2009 | Okabe | G06F 11/1008 714/807 |
| 2012/0297271 A1* | 11/2012 | Sommer | G06F 11/1048 714/766 |
| 2015/0358825 A1* | 12/2015 | Dinan | H04W 4/029 380/274 |
| 2017/0171745 A1* | 6/2017 | Asterjadhi | H04W 12/02 |

* cited by examiner

METHOD FOR TRANSMITTING SECURITY DATA AND METHOD FOR RECEIVING SAME

CROSS REFERENCE TO RELATED APPLICATIONS

This application is the National Phase of PCT International Application No. PCT/KR2014/009776, filed on Oct. 17, 2014, which claims priority under 35 U.S.C. 119(e) to U.S. Provisional Application No. 61/901,427, filed on Nov. 7, 2013, all of which are hereby expressly incorporated by reference into the present application.

BACKGROUND OF THE INVENTION

Field of the Invention

The present invention relates to a method for transmitting security data and a method for receiving the same.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The uplink channel is used to transmit various uplink control information such as hybrid automatic repeat request (HARQ) ACK/NACK, Channel State Information (CSI), and a scheduling request (SR).

Meanwhile, it is very important to stably send data so that the data are not wiretapped (not received and decoded) by an undesirable wiretapper in a wireless communication system.

Currently, various schemes for stably transmitting/receiving data are applied to LTE/LTE-A. However, the various schemes are very insufficient to satisfy security requirements having a higher level.

SUMMARY OF THE INVENTION

The present invention has been made in an effort to solve the above-discussed problem.

In order to accomplish the above object, there is provided a method for transmitting security data. The method may comprise: outputting a first sequence by scrambling a bit stream of dummy data; outputting a second sequence by scrambling the security data to be transmitted by using the bit stream; and transmitting a first code word and a second code word obtained by encoding the first sequence and the second sequence.

The method may further comprise: encoding the dummy data to the bit stream.

The dummy data comprises a random sequence.

In order to accomplish the above object, there is provided an apparatus for transmitting security data. The apparatus may comprise: a first scrambler configured to output a first sequence by scrambling a bit stream of dummy data; a second scrambler configured to output a second sequence by scrambling the security data to be transmitted by using the bit stream; and an encoder configured to generate a first code word and a second code word by encoding the first sequence and the second sequence.

In order to accomplish the above object, there is provided a method for receiving security data. The method may comprise: receiving a first code word and a second code word; acquiring a first sequence and a second sequence by decoding the first code word and the second code word, respectively; and acquiring security data by descrambling the first sequence by using the second sequence.

The acquiring of the security data comprises: acquiring dummy data by descrambling the second sequence; acquiring a bit stream by encoding the dummy data; and acquiring the security data by descrambling the first sequence by using the bit stream.

According to a disclosure of the present specification, the above-discussed problem is solved. In detail, an error probability difference between a wiretapper and a legal receiver can be increased through an encoding scheme according to the present specification. A security communication having a higher level may be achieved by additionally setting a code rate.

DESCRIPTION OF EXEMPLARY EMBODIMENTS

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Figure 1:
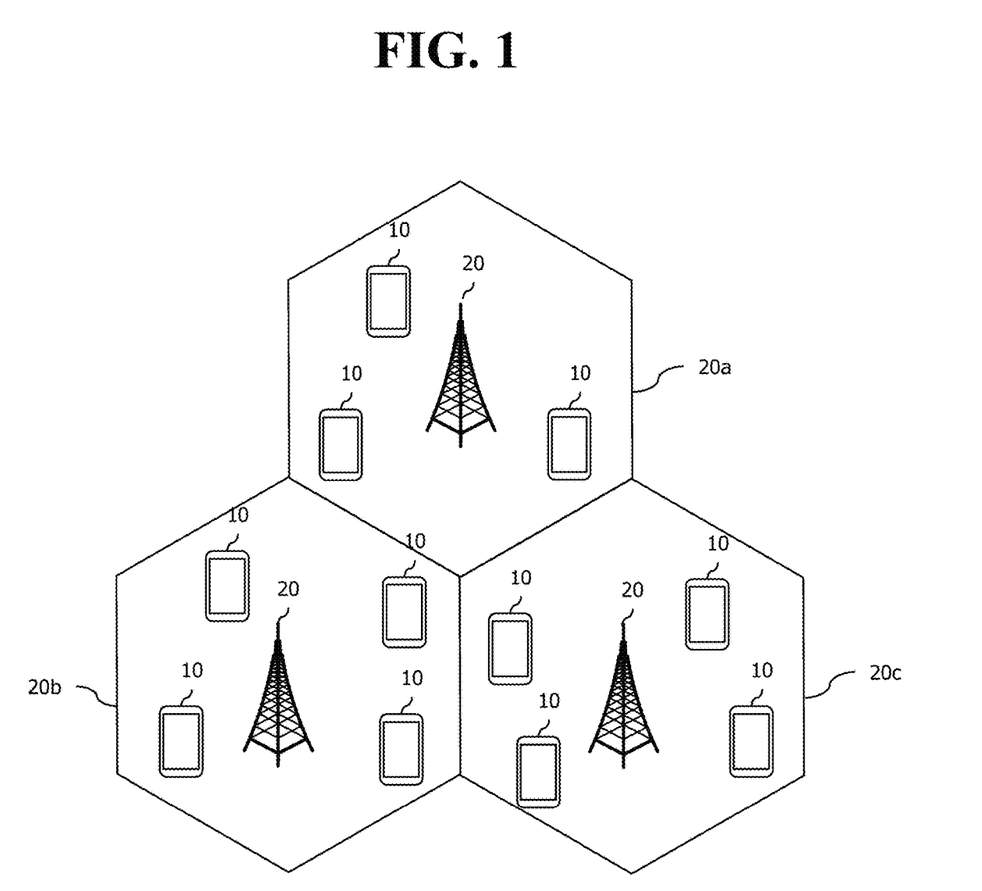
FIG. 1 illustrates a wireless communication system.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
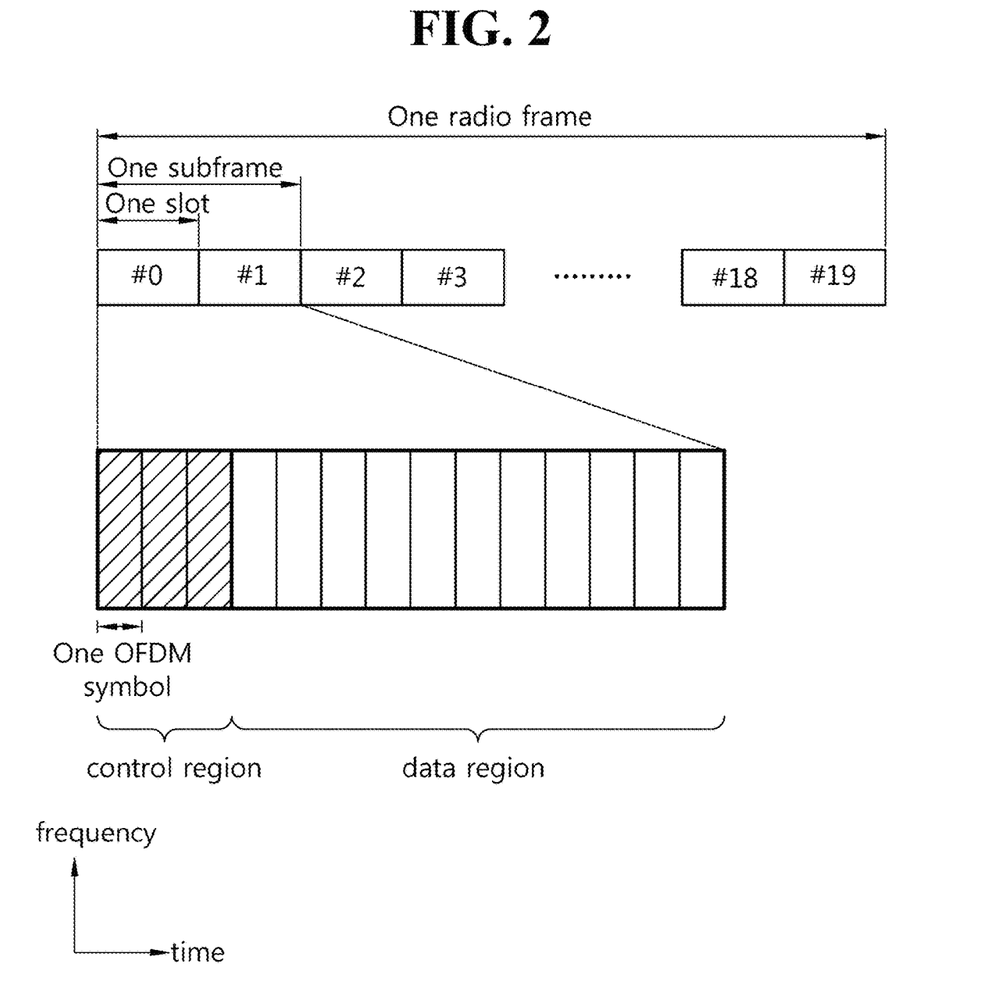
FIG. 2 illustrates a structure of a downlink radio frame in 3GPP LTE.

FIG. 2 shows a downlink radio frame structure according to FDD of $3^{rd}$ generation partnership project (3GPP) long term evolution (LTE).

The radio frame of FIG. 2 may be found in the section 5 of 3GPP TS 36.211 V11.2.0 (2013-02) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V11.2.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The terminal receives the DL transport block on a PDSCH indicated by the DL resource assignment.

Figure 3:
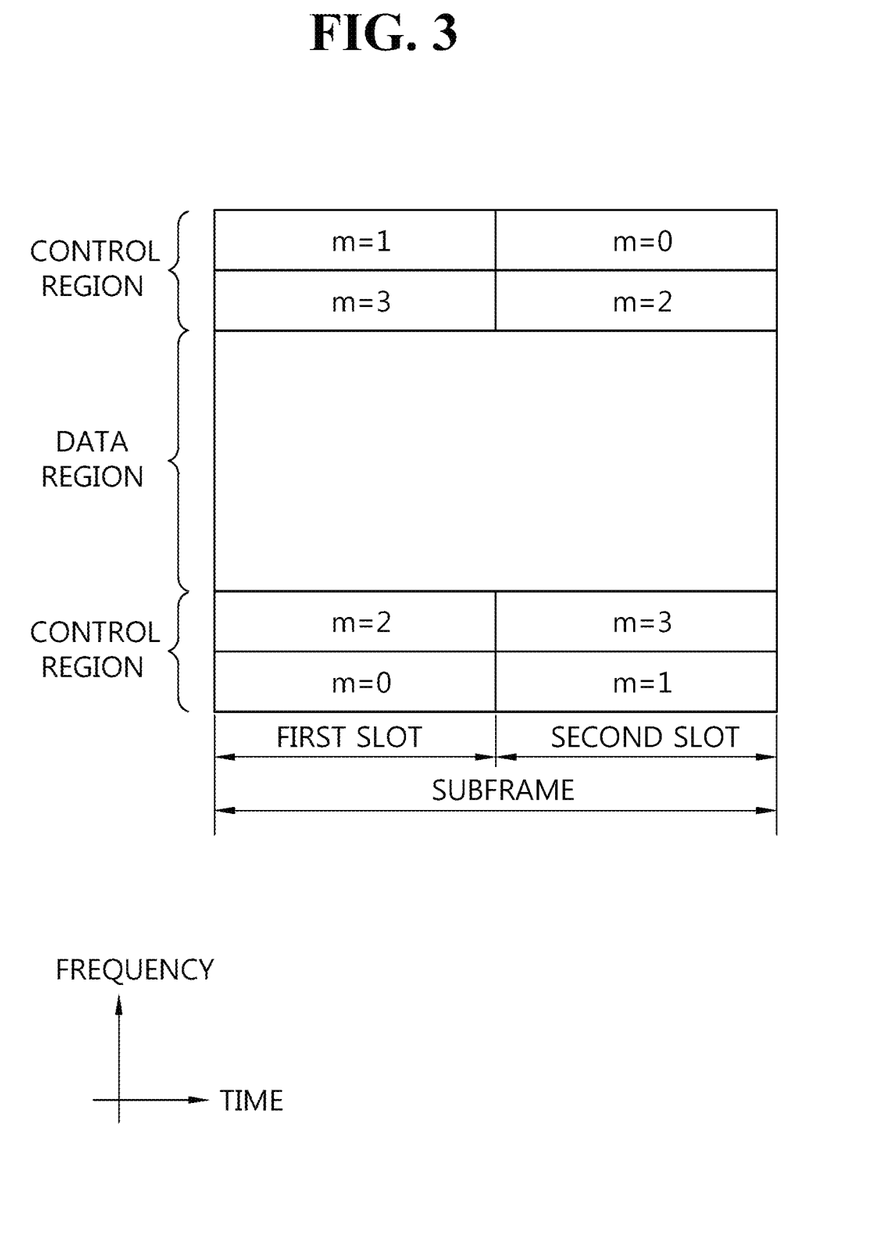
FIG. 3 illustrates a structure of a downlink radio frame in 3GPP LTE.

FIG. 3 shows a structure of an uplink subframe in 3GPP LTE.

Referring to FIG. 3, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 4:
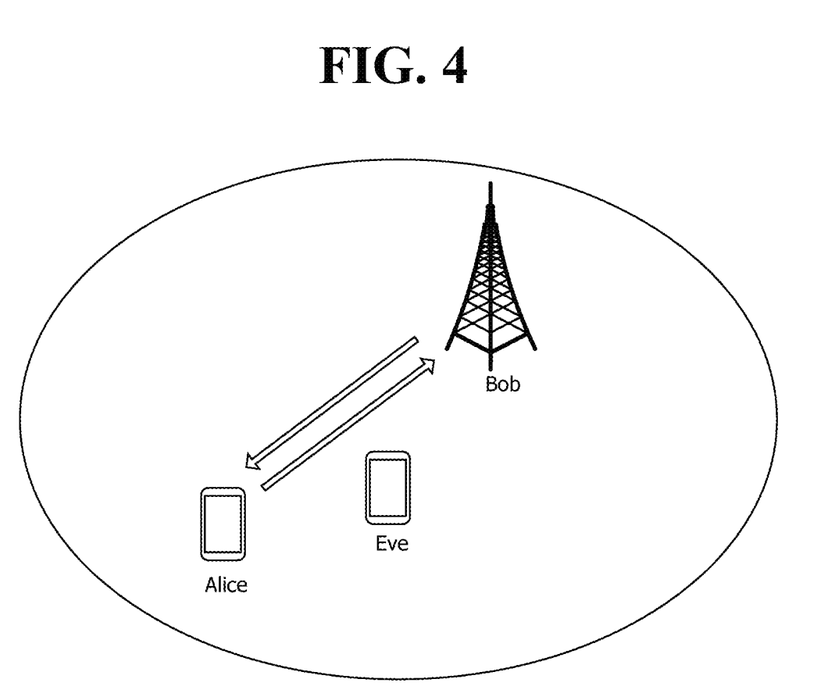
FIG. 4 illustrates an example of wiretapping in a wireless communication system.

FIG. 4 illustrates an example of wiretapping in a wireless communication system.

Referring to FIG. 4, if Alice and Eve are UE and Bob is a base station, the Eve may wiretap data transmitted/received by the Alice and the Eve. In this case, in the present specification, the data transmitted/received by the Alice and the Eve refer to non-secret data.

Accordingly, it is very important to stably send data so that the data is not tapped (not received and decoded) by an undesirable wiretapper in the wireless communication system.

As described above, a security communication scheme for stably sending data, the related art has a great tendency to use an encryption scheme in an upper layer. However, in recent years, approaches of a scheme using characteristics of a radio channel in a physical channel or based on a physical layer scheme (for example, a power control or frequency mapping method, a precoding scheme, an encoding scheme, and the like) have been attempted. As described above, a security scheme performed in the physical layer is a scheme that allows a desired receiver (that is, a base station) to easily receive a signal transmitted from a transmitter but causes a wiretapper not to receive the signal or to receive but not to be decoded.

The physical layer security scheme includes different security concepts. For example, it is assumed that Xn is a code word of a length n transmitted from Alice, and Zn is a code word received by Eve. Accordingly, there may be securities having theoretically different levels as follows.

(A) Perfect Security (One Time Pad of Shannon)

$$I(X^n; Z^n) = 0, \text{ for any } n \qquad \text{Equation 1}$$

The equation 1 is valid with respect a finite n. In the perfect security, the transmitted code word is completely irrelevant to the received code word. Accordingly, the Eve may not acquire any information with respect to the Alice to include a received code word. However, in order to ensure the above perfect security, Entropy of a secrete key should always be lower than Entropy of a source message. Accordingly, a temporary pad of Shanon is not actually applicable to a real communication environment.

(B) Security in Strong Sense)

$$\lim_{n \to \infty} I(X^n; Z^n) = 0 \qquad \text{[Equation 2]}$$

This refers to strong security. If a length of a code is increased, mutual information is converged to 0. For example, when I(Xn; Zn)=I/n, a system is safe in strong sense. Although the system is gradually safe in a large n, the system may not perfectly safe with respect to the finite n.

(C) Security in Weak Sense $$\lim_{n \to \infty} \frac{1}{n} I(X^n; Z^n) = 0 \qquad \text{[Equation 3]}$$

This refers to weak security. If a length of a code is increased, a rate of mutual information is converged to 0. For example, if I(Xn; Zn)=n½, a system is safe in weak sense. Weak security in a real environment does not ensure that mutual information itself is reduced if the n is increased.

(D) Secure in Block Error Probability (Asymptotic Sense):

$$\lim_{n \to \infty} P_e^{(n)} = 1 \qquad \text{[Equation 4]}$$

In this case, Pe(n) represents a probability to be decoded of the received code word different from the transmitted code word, that is, a block error probability. When a transmission data rate is greater than a channel capacity, the block error probability is n2 which is similar to 1.

(E) Security in SINR $$\text{SINR}_{Eve} \leq \text{SINR}_{TH} \qquad \text{Equation 5}$$

In this case, the SINREve represents an SINR measured by Eve. The reference is often used to design cooperation jamming.

As described above, reference setting with respect to security communication achievement may be expressed in the form of mutual information (or security capacity/rate) described in information theory, and may be expressed based on an SINR value associated with an error probability with respect to the wiretapper. In the present specification, an encoding scheme for security communication is expressed in the form of a code rate, and is applicable according to the reference or through extension.

Meanwhile, in an example shown in FIG. 4, it is assumed that a channel state between Alice and Bob is better (higher) than a channel state between Alice and Eve. It is assumed that a situation with respect to the channel state is measured by Alice or is known through signaling.

As described above, when a state of a channel (hereinafter referred to as 'legal channel') between Alice and Bob is better than a state of a channel (hereinafter referred to as 'wiretapping channel') between Alice and Eve (when a rate value of a channel gain is high), an error probability of Eve with respect to the same signal may be probabilistically higher than an error probability of Bob. In this case, according to setting the code rate, it may be considered that Bob receives data without errors, and Eve receives data including an error with respect to a part or the whole of the data. When taking into consideration communication using an existing system without considering the existing security communication, an amount of information of the Eve may not be disregarded in the above situation. For example, that is because an error of 1 bit occurs with respect to a corresponding code word (or packet) but security with respect to remaining information except for 1 bit is not achieved in a corresponding situation. As a solving or reducing scheme with respect to the case, there may be a need for a communication scheme where an amount of an error is rapidly changed with respect to a case of generating an error, a situation of not generating the error, or a situation of an error higher than a predetermined level and a situation of an error lower than the predetermined level.

Accordingly, the present invention suggests an encoding scheme according to the requirement.

Figure 5:
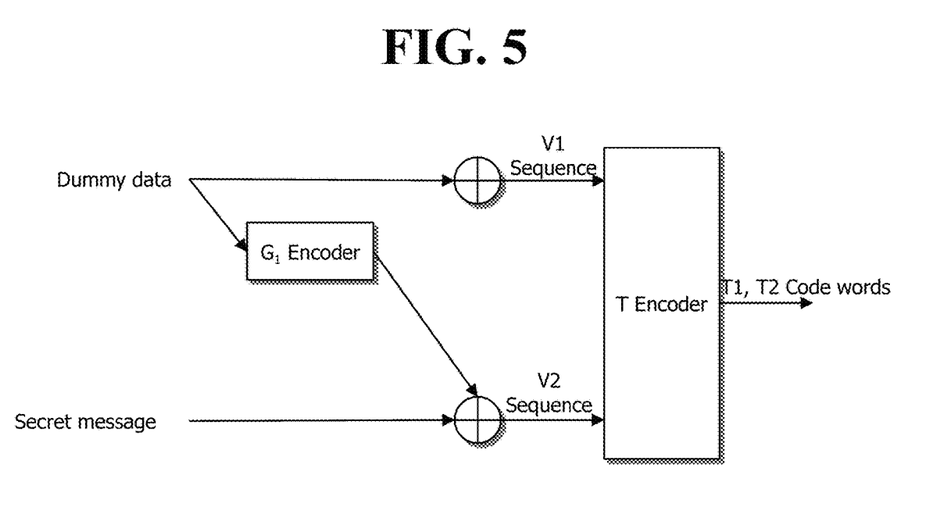
FIG. 5 is an exemplary diagram illustrating an example of an encoding scheme (asymmetric type transmitter) for achieving security communication according to a first embodiment of the present specification.

FIG. 5 is an exemplary diagram illustrating an example of an encoding scheme (asymmetric type transmitter) for achieving security communication according to a first embodiment of the present specification.

Referring to FIG. 5, a transmitter (that is, UE)(e.g., Alice) may encode a secret message to be protected using dummy data to transmit the encoded secret message. The dummy data serves as a secret key with respect to the secret message. For example, the dummy data may be a random sequence having no information. That is, the dummy data may be generated by generating the random sequence.

In detail, the dummy data is encoded through a G1 encoder so that a bit stream is output. Accordingly, the secret message to be protected is scrambled using the bit stream by a scrambler so that a V2 sequence is output.

Meanwhile, the dummy data itself is scrambled by the scrambler so that a V1 sequence is output.

An error procedure process on the V2 sequence and the V1 sequence may be performed through T encoding to be transmitted.

Meanwhile, a receiver (that is, a base station)(e.g., Bob) acquires a V1 sequence and a V2 sequence through decoding, and then descrambles the decoded V2 sequence using the decoded V1 sequence to acquire the secret message. In more detail, the receiver acquires the dummy data by descrambling the V1 sequence and acquires a bit stream by G1 encoding the dummy data. Next, the receiver may acquire the secret message by descrambling the V2 sequence using the bit stream.

However, if the receiver (that is, base station) fails decoding the V1 sequence, although decoding the V2 sequence is succeeded, it may be difficult to extract the secret message. This depends on design of the G1 encoder and setting of a code rate with respect to the dummy data and the secret message.

Figure 6:
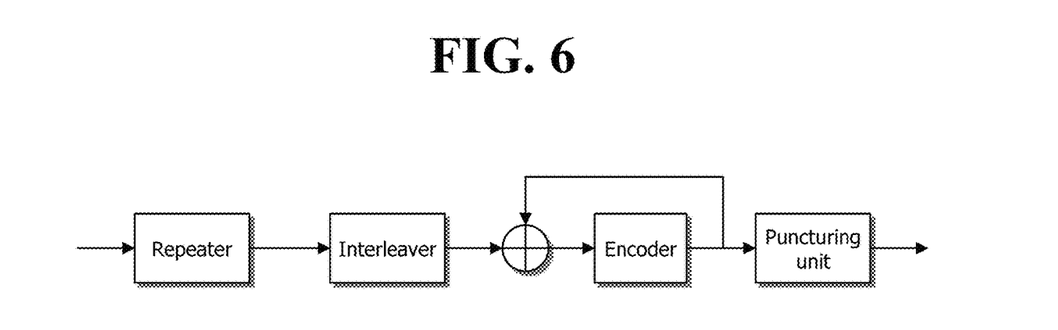
FIG. 6 illustrates a detailed configuration of a G1 encoder shown in FIG. 5.

FIG. 6 illustrates a detailed configuration of a G1 encoder shown in FIG. 5.

Referring to FIG. 6, the G1 encoder may be designed in the type of a RA code encoder so that the wiretapper (e.g., Eve) may not sufficiently acquire the scrambled V2 sequence. For example, the G1 encoder may include a repeater, an interleaver, a combiner, and a puncturing unit.

In the shown G1 encoder, the relationship between the dummy data and a scrambling sequence is many-to-one (different dummy data may be mapped to the same scrambling sequence) according to a method of configuring the interleaver and the puncturing unit and may not correspond to a joint typical form between different dummy data mapped to the same scrambling sequence. Further, a rate of bit 1 and a rate of bit 0 configuring the scrambling sequence may be expressed in a similar form. In this case, it is inefficient to extract the bit stream used to scramble the secret message from an error with respect to the dummy data or a generation possibility may be too low. The above contents depend on rate setting of the dummy data and the secret message. For example, the rate may be set by following equations 1 and 2.

$$R_{eve} < R_{Msg} + R_{dummy} < R_{Bob} \quad \text{[Equation 6]}$$

$$R_{Msg} = (R_{Bob} - \Delta_2) - (R_{eve} + \Delta_1) \quad \text{[Equation 7]}$$

In the equation 7, a R_Bob expresses a data rate capable of transmitting (probabilistically) without an error between Alice and Bob. A R_eve expresses a data rate of transmitting (probabilistically) without an error between Alice and Eve. The Δ1 and the Δ2 are a calibration value and may be used to adjust the data rate in detail in a real environment. Complexity of a receiver of the Eve is similar to that of Bob, rate setting may be sufficient by the equation 6.

Meanwhile, as described above, the dummy data functions as a secret key with respect to the secret message. Accordingly, the situation that the wiretapper Eve does not sufficiently receive is considered similar to the secret message. Therefore, upon rate setting, it is set so that Bob may receive a rate sum of the secret message and the dummy and Eve may not receive the rate sum of the secret message. When a rate with respect to the dummy data is too low in the above, the number of scrambling sequences generated through the G1 encoder may be reduced. In this case, since a wiretapper Eve may perform an exhaustive search using a possible scrambling sequence combination, the rate with respect to the dummy data should be set greater than a predetermined level. The rate setting with respect to the dummy data may be limited to design that an entropy value with respect to the dummy data is greater than an entropy value with respect to the secret data.

Figure 7:
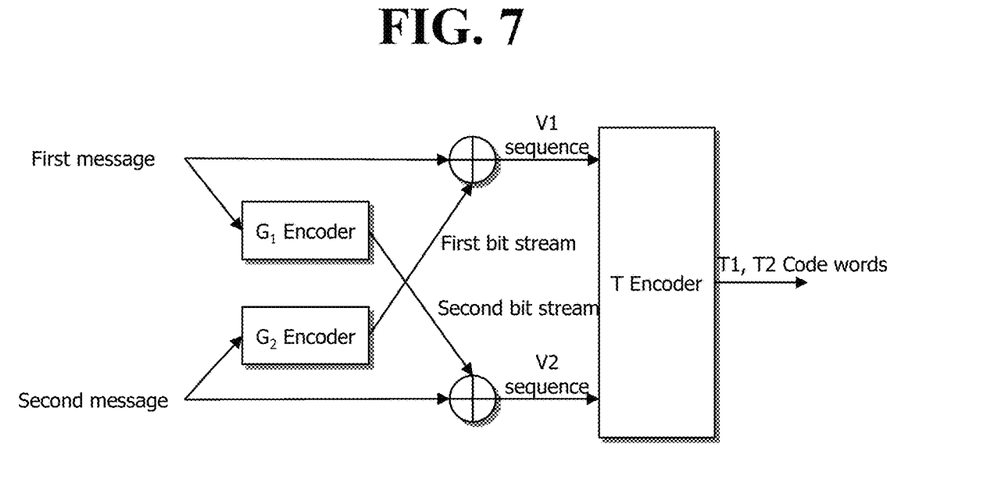
FIG. 7 is an exemplary diagram illustrating an example of an encoding scheme (symmetric type transmitter) for achieving security communication according to a second embodiment of the present specification.

FIG. 7 is an exemplary diagram illustrating an example of an encoding scheme (symmetric type transmitter) for achieving security communication according to a second embodiment of the present specification.

Referring to FIG. 7, a transmitter (that is, UE)(e.g., Alice) may encode a first message using a second message to transmit the encoded first message. The first message may be a secret message to be protected. The second message may be a secret message to be protected but may be dummy data.

The first and second messages may be scrambled to each other before passing through a T encoder (e.g., Turbo coding, LDPC coding, trellis coding, and the like) for protection with respect to the error. Before the scrambling, the first message may be converted into a first bit stream through G1 encoding. Similarly, the second message may be converted into a second bit stream through G2 encoding. The first bit stream may be used to scramble the second message. Further, the second bit stream may be used to scramble the first message. In other words, the first message is scrambled using the second bit stream encoded by the G2 encoder and the scrambled first message is output as a V1 sequence, and then the V1 sequence is encoded by a T encoder so that a T1 code word is transmitted. Similarly, the second message is scrambled using the first bit stream encoded by the G1 encoder and the scrambled second message is output as a V2 sequence, and then the V2 sequence is encoded by the T encoder so that a T2 code word is transmitted.

Accordingly, the receiver (e.g., Bob) acquires a V1 sequence and a V2 sequence by decoding the T1 code word and the T2 code word, and descrambles and decodes the V1 sequence and the V2 sequence to acquire the first message and the second message. However, if both of the V1 sequence and the V2 sequence are not sufficiently decoded, an error generation possibility may be increased when acquiring the first message and the second message.

Meanwhile, the G1 encoder and the G2 encoder generate a bit stream to be used in scrambling. When the Eve attempts wiretapping, in order to increase generation of an error in the tapping stage, the code rate is set to 1 or is set greater than 1 (may refer to a Flashing function). When the code rate is set greater than 1, a legal receiver may not sufficiently extract the first message and the second message. Accordingly, in this case, it may be understood that the first message and the second message include dummy information. Basically, the configuration of the G1 encoder and the G2 encoder should be designed to sufficiently extract the first message and the second message from the bit stream before encoding (T1, T2) for correcting an error. To this end, one-to-one correspondence between a bit combination should be satisfied. An example of the equation with respect to the above is as follows.

$$X = GM \text{ where } G = \begin{bmatrix} I_k & G_2 \\ G_1 & I_l \end{bmatrix}, M = \begin{bmatrix} Msg1 \\ Msg2 \end{bmatrix} \quad \text{[Equation 8]}$$

$$\text{If } \det(G) = \det(I_k \oplus G_2G_1) = \det(I_l \oplus G_1G_2) \neq 0, \quad \text{[Equation 9]}$$
$$m = G^{-1}X$$

In addition, in order to configure the G1 encoder and the G2 encoder, when a message is extracted from a decoder in the receiver, a form for minimizing leakage of secret information should be considered. That is, it should be designed so that an error generated from an output of the decoder does not generate error propagation during a message extracting process. In order to design the G1 encoder based on a RA encoding, when the V2 is not sufficiently received, it may be difficult to predict the first message therefrom. In a case of the G2 encoder, when it is equally designed based on the RA encoding, the equation 9 is not satisfied, the legal receiver may not sufficiently extract messages. Accordingly, inevitability of a scrambling stage may be acquired as illustrated in the equation 9 by applying a different code except for the RA encoding or using different interleavers. In the present example, in order to generate a situation sufficiently received by Bob and a situation not sufficiently received by the Eve, rate setting with respect to the secret message should be suitably performed. A following equation 10 is an example of a secret message rate setting.

$$R_{eve} < R_{V1} + R_{V2} < R_{bob}$$ [Equation 7]

$$R_{Msg,1} + R_{Msg,2} = (R_{bob} - \Delta_2) - (R_{eve} + \Delta_1)$$ [Equation 7]

In A difference of an example of security communication shown in FIG. 5 and an example of security communication shown in FIG. 7, an amount of the secret data to be transmitted is improved by scrambling the dummy data or scrambling different secret data from each other instead of the dummy data. When complexity of a receiver of the Eve is similar to that of Bob, rate setting by the equation 6 may be sufficient.

In order to extract the secret message using a bit stream acquired through decoding with respect T1 encoding and T2 encoding by the receiver, when a length of a bit stream becomes long, an inversion procedure with respect to the G encoding, that is, the decoding process may be ineffectively or computationally impossible. Accordingly, a structure of extracting a secret message may be considered by taking into consideration computational complexity.

Figure 8:
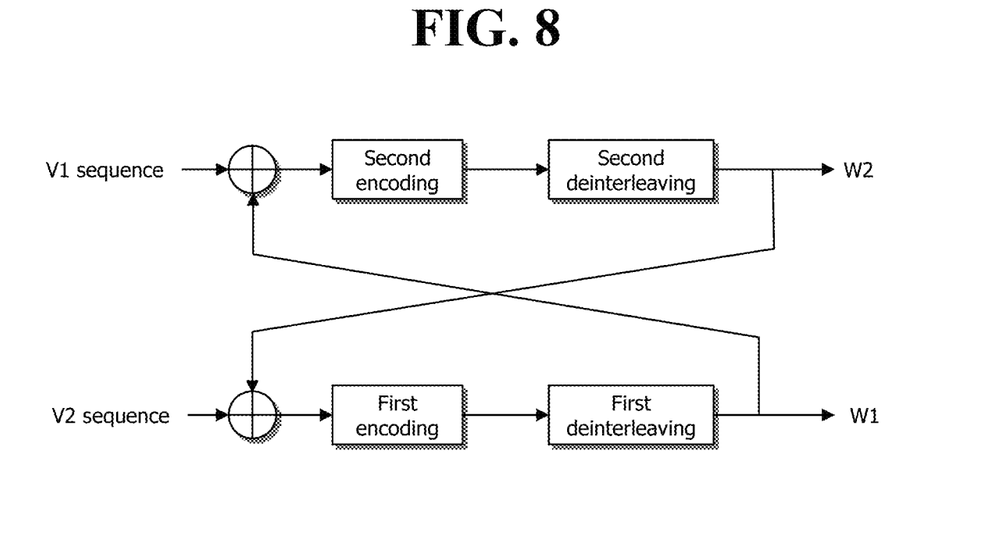
FIG. 8 is an exemplary diagram illustrating a scheme in a receiver corresponding to a transmitter shown in FIG. 7.

FIG. 8 is an exemplary diagram illustrating a scheme in a receiver corresponding to a transmitter shown in FIG. 7.

FIG. 8 illustrates a procedure of extracting secret messages from an output of a decoder with respect to error correction codes (that is, a T1 code word and a T2 code word), that is, the V1 sequence and the V2 sequence. In other words, FIG. 8 illustrates a process of extracting secret message including a first message and a second message from the V1 sequence and the V2 sequence which are results obtained by decoding the T1 code word and the T2 code word by the receiver.

The V1 sequence corresponding to an output of the decoder with respect to the T1 code word may be expressed as a function with respect to the first message and the scrambled second message. Similarly, the V2 sequence corresponding to an output of the decoder with respect to the T2 code word may be expressed as a function with respect to the second message and the scrambled first message. However, factorization between real two streams may be computationally impossible due to an XOR procedure before error correction code by an encoding stage. Extraction of the secret data may be considered using a repetition structure as shown in FIG. 8. A decoding and deinterleaving procedure on a RSC corresponding to a G2 and a G1 with respect to the V1 sequence and the V2 sequence is performed. When the results are W2 and W1, the W2 XORs with the V1 sequence and the W1 XORs with the V2 sequence so that the above procedure is repeated. The number of times of repetitions may be previously designated. It may consider to XOR the random sequence before initially decoding the V1 sequence and the V2 sequence. Another method may extract the secret data in a scheme of searching the highest or lowest cost value (e.g., LLR value) in a procedure of extracting the W2 from the V1 sequence while changing a possible value of the W1 (or W2).

Another example of extracting the secret message may consider to applying a forward substitute scheme or a backward substitute scheme after a Gaussian elimination process on a G.

Meanwhile, as shown in FIG. 5 and FIG. 7, in a case of a suggested communication scheme, the receiver Bob may succeed decoding of both of two reception code words to sufficiently extract a message. A wiretapper Eve may prevent the message from being extracted although one of two code words is decoded and a remaining one is not sufficiently decoded. However, the above contents are a case where Eve may use a receiver of the same complexity as that of Bob. There is a need to consider a case where the Eve may use a receiver having a performance higher than that of Bob for the purpose of illegally wiretapping.

Figure 9:
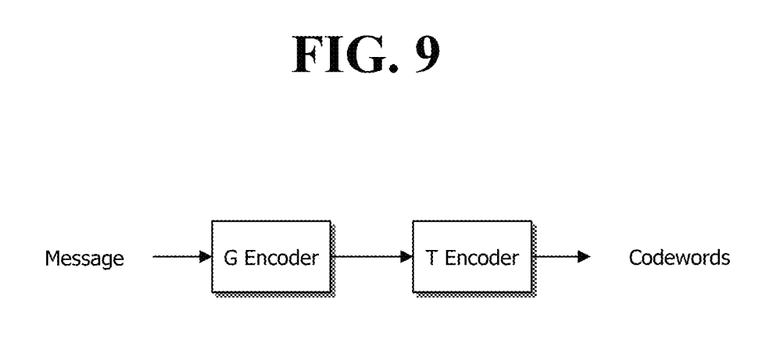
FIG. 9 is an exemplary diagram schematically a scheme according to the first and second embodiments of the present specification.

FIG. 9 is an exemplary diagram schematically a scheme according to the first and second embodiments of the present specification.

FIG. 9 illustrates each scheme of FIG. 5 and FIG. 7 in a matrix pattern. The wiretapper may consider a situation of using a decoder type through a report exhaustive search in a generation matrix of TG as illustrated in the equation 12. This case may consider to design G1 and G2 so that an error performance of a final generation matrix TG is deteriorated (e.g., an average distance and a minimum distance between code words is reduced).

$$c = TGm \text{ where } G = \begin{bmatrix} I_k & G_2 \\ G_1 & I_l \end{bmatrix}, M = \begin{bmatrix} Msg1 \\ Msg2 \end{bmatrix}$$ [Equation 12]

The embodiments of the present invention described so far may be implemented through various means. For example, the embodiments of the present invention may be implemented by hardware, firmware, software or the combination thereof. Particularly, this will be described by reference to drawing.

Figure 10:
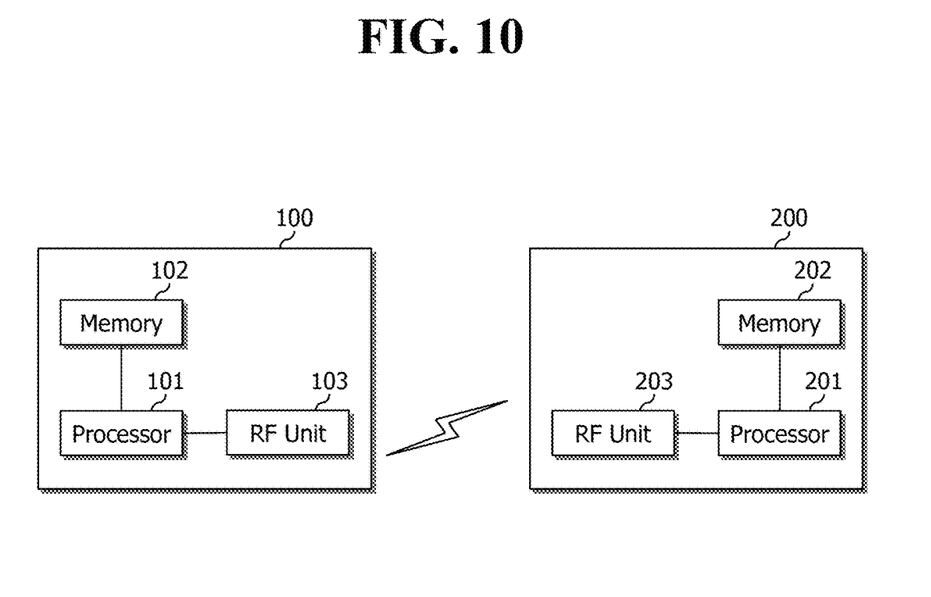
FIG. 10 is a block diagram illustrating a wireless communication system in which a disclosure of the present specification is implemented.

FIG. 10 is a block diagram illustrating a wireless communication system in which a disclosure of the present specification is implemented.

ABS 200 includes a processor 201, a memory 202, and an RF (radio frequency) unit (the MTC device) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

The MTC device 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting security data by a user equipment (UE), the method comprising:
   generating dummy data;
   generating a first sequence by scrambling the dummy data;
   generating a bit stream of the dummy data by encoding the dummy data;
   scrambling the security data by using the bit stream of the dummy data;
   generating a second sequence from the scrambled security data; and
   transmitting, by the UE to a base station, a first code word generated from the dummy data and a second code word generated from the scrambled security data, wherein the first code word is obtained based on encoding of the first sequence and the second code word is obtained based on encoding of the second sequence.

2. The method of claim 1, wherein the dummy data comprises a random sequence.

3. An apparatus for transmitting security data, the apparatus comprising:
   a memory; and
   a processor coupled with the memory,
   wherein the processor is configured to:
      generate dummy data;
      generate a first sequence by scrambling the dummy data,
      generate a bit steam of the dummy data by encoding the dummy data,
      scramble the security data by using the bit stream of the dummy data,
      generate a second sequence from the scrambled security data, and
      transmit, to a base station, a first code word generated from the dummy data and a second code word generated from the scrambled security data, wherein the first code word is obtained based on encoding of the first sequence and the second code word is obtained based on encoding of the second sequence.

4. The apparatus of claim 3, wherein the dummy data comprises a random sequence.

5. A method for receiving security data by a base station, the method comprising:
   receiving, by the base station from a user equipment, a first code word and a second code word;
   acquiring a first sequence by decoding the first code word and a second sequence by decoding the second code word;
   acquiring dummy data by descrambling the second sequence;
   acquiring a bit stream of the dummy data by encoding the dummy data;
   descrambling the first sequence by using the bit stream of the dummy data; and
   acquiring the security data based on the descrambled first sequence,
   wherein the first code word is generated from the security data scrambled using the dummy data, and the second code word is generated from the dummy data.

6. The method of claim 5, wherein the dummy data comprises a random sequence.

* * * * *